May 12, 1942.  A. P. HAUEL  2,282,760
ELECTRODE
Filed July 22, 1939
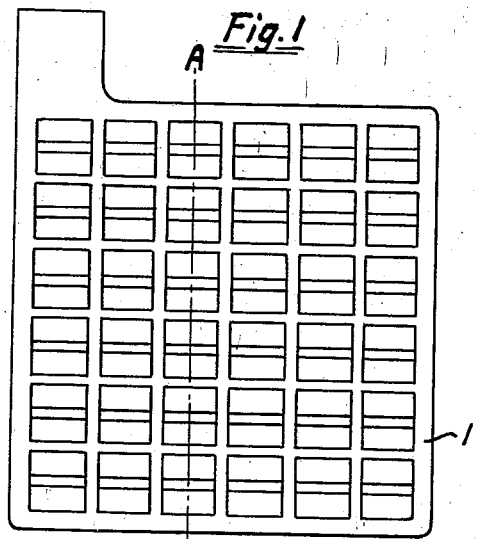
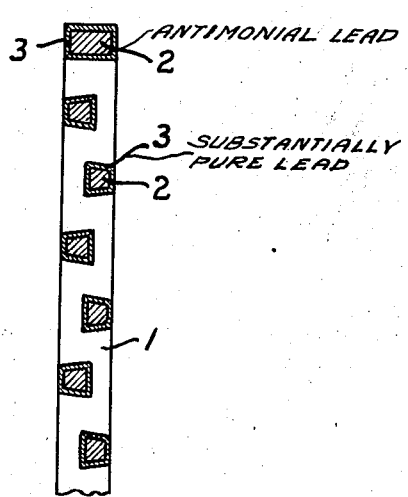
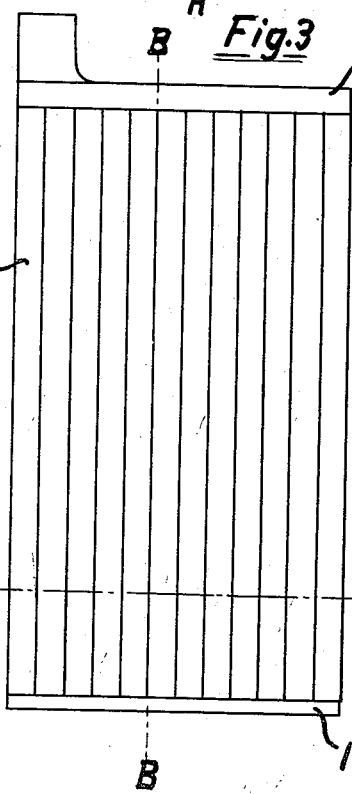
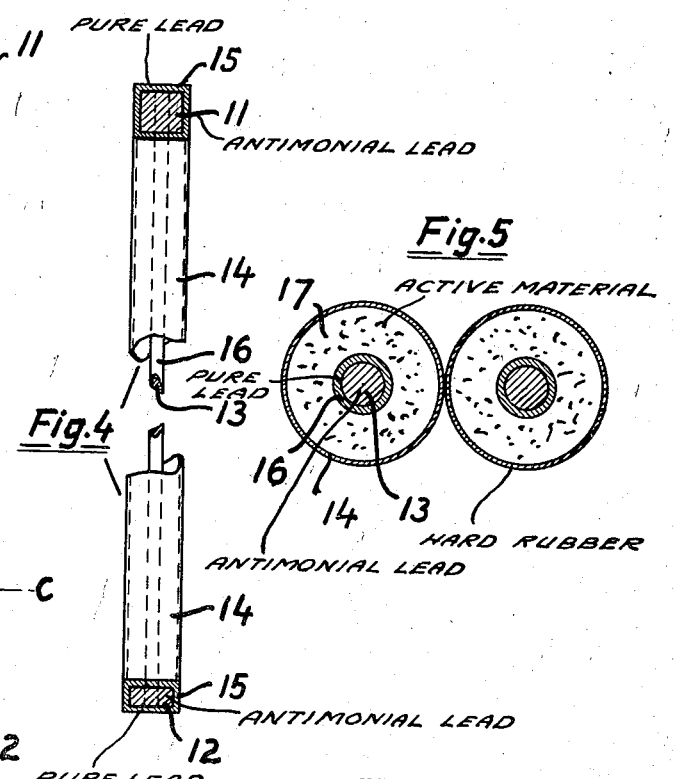
INVENTOR
Anna P. Hauel
BY C. A. Onn.
Agent.

Patented May 12, 1942

2,282,760

UNITED STATES PATENT OFFICE 2,282,760

ELECTRODE

Anna P. Hauel, New York, N. Y., assignor to The Electric Storage Battery Company, Philadelphia, Pa., a corporation of New Jersey Application July 22, 1939, Serial No. 285,857

2 Claims. (Cl. 136—64)

My present invention relates to electrodes for storage batteries of the lead acid type and to processes of manufacture of such electrodes.

It is well known to manufacture the supports for the active material in lead storage batteries of antimonial lead; supports of such lead alloys are of higher mechanical strength and adapted to serve also as reinforcements for the electrodes. On the other side electrodes of this type have the disadvantage that by charging the batteries traces of the antimony content of the positive electrodes get dissolved by oxidation. This oxidation is caused by oxygen nascent by said charging; thereby antimony oxide is formed which is soluble in the electrolyte of the batteries. The antimony traces in the electrolyte wander to and get deposited on the negative electrodes. Deposited on the negative electrodes these antimony traces are the cause for formation of hydrogen gas during the time batteries are allowed to stand idle; this means a self-discharge of the batteries, if standing idle in charged state for longer time.

The self-discharge connected with formation of hydrogen has the disadvantages that the efficiency of the batteries is lessened and that besides this the formation of hydrogen may often be the cause for blow-ups.

It is therefore the main object of my invention to prevent the formation and liberation of hydrogen gas in lead acid storage batteries with electrode supports made of antimonial lead or made of a lead alloy containing a substantial percentage of a metal being more electro-positive than lead i. e. ranging nobler in the electrochemical series.

It is a further object of my invention to make these supports of antimonial lead with a high percentage of antimony without danger of formation of hydrogen gas.

It is still a further object of my invention to form the supports for the active material and for distribution and transport of the current of antimonial lead with a small cross section and preventing simultaneously the formation of antimony traces in the electrolyte.

Another and still very important object of my invention is to provide these supports made of antimonial lead with a protecting layer, avoiding thereby antimony in the electrolyte.

It is still another object of my invention to provide a storage battery of the described type with two or more electrodes, one or more of these electrodes comprising a metallic support, said metallic support consisting of a lead alloy containing a certain percentage of a metal selected from the group of metals being more electro-positive than lead, a metallic layer surrounding said support, said metallic layer consisting of a lead alloy containing a smaller percentage, of a metal selected from the group of metals being more electro-positive than lead, than said metallic support, and active material on the outer surface of said metallic layer.

In carrying out my invention the electrode comprises a metallic support, said metallic support consisting of a lead alloy containing more than 0.2 percent of a metal being more electro-positive than lead, a metallic layer surrounding said support, said metallic layer consisting of a lead alloy containing less than 0.2 percent of a metal being more electro-positive than lead, and active material on the outer surface of said metallic layer.

It is of advantage to cover the entire exposed surface of the electrode with the metallic layer in order to avoid any dissolution of antimony contained in the metallic supports of the electrodes.

It is further of advantage to give the layer on the support the form of a coating which may be preferably formed by electro-deposition or by dipping the support into fused pure lead or by pressing a thin sheet of lead alloy on the supports, the alloy from which said sheets are made containing less than 0.2 percent of a metal being more electro-positive than lead. The sheet-shaped lead alloy layer may also be secured to the support by rolling, plumbing or soldering in a manner known per se.

I propose further to use for the supports of the active material an alloy of lead and antimony containing more than 0.2 percent of antimony and for the layers a coating of less than 0.2 millimeter thickness of an alloy containing less than 0.2 percent of a metal being more electro-positive than lead.

If a support of small section is required, I propose to use for the supports an alloy of lead and antimony containing between four and fifteen percent, preferably about thirteen percent, of antimony and to use for the coating substantially pure soft lead.

In order to provide said supports with a surface especially resistant against corrosion, I propose to use for the layer or coating an alloy of lead and tellurium, consisting substantially of lead and containing a small percentage e. g. 0.1 percent of tellurium and less than 0.5 percent of a metal being more electro-positive than lead e. g. antimony.

The layers or coatings on the supports made of antimonial lead serve not as independent supports for the active material as this would increase the size of the electrodes and give them a relatively large cross section; therefore I propose to provide said supports with relatively thin layers, the relation between the weight of said layers and the weight of said supports being from 5:100 to 30:100. In a preferred embodiment of my invention I use as supports grids of two millimeters thickness covered by a coating of 0.1 millimeter thickness, said coating covering the entire exposed surface of said grid.

According to my invention the electrodes are produced by making an alloy of lead and antimony, casting from this alloy electrode grids, covering or coating these grids with layers of a lead alloy containing less than 0.2 percent of a metal being more electro-positive than lead, pasting thereafter said coated electrode grids with active material, and forming from the thus coated and pasted grids the electrodes in usual manner.

In the accompanying drawing

Fig. 1 is a plan view of a grid for a lead acid pasted plate,

Fig. 2 is a cross section on line A—A of the grid shown in Fig. 1,

Fig. 3 is a plan view of a tubular type plate,

Fig. 4 is a cross section on line B—B, partly broken away, of the plate shown in Fig. 3, and Fig. 5 is a cross section of the tubes of this tubular type plate.

As shown in Fig. 1 the grid for the pasted plate consists of a frame 1 and supporting means 2. Frame and supporting means are made of antimonial lead. As shown in Fig. 2 the grid is coated with a coating 3 consisting of a lead alloy containing less antimony than the grid itself. Preferably the coating is made of pure lead.

The tubular i. e. "iron clad" type plate consists of an upper frame 11 and a lower frame 12 holding the grid tubes of said plate. These grid tubes consist of cores 13 inserted in hard rubber tubes 14, said cores and hard rubber tubes connected at their ends to the frames 11 and 12. As proposed by my present invention the cores 13 and the frames 11, 12 consist of antimonial lead. The cores are provided with a coating 16 and the frames with a coating 15 of preferably pure lead.

The space between the coated cores and the hard rubber tubes of the "iron clad" type plate is filled with active material 17.

The process according to my invention may be performed in one of the following manners:

1. I make an alloy containing 88 percent of lead and 12 percent of antimony, cast from this alloy an electrode grid, provide this grid with an electro-deposition of a lead alloy containing less than 0.5 percent of antimony. I make the electro-deposition in such a way that the relation between the weight of the deposition and the weight of the support is from 5:100 to 30:100. The thus coated grids are pasted with active material and the thus coated and pasted grids treated in a manner known per se.

2. My invention may also be used for lead acid storage batteries of the "iron-clad" type. The grid of the plates of "iron-clad" batteries is composed of a number of parallel vertical rods of antimonial lead which are burned to supporting frames at the top and bottom. Each vertical rod forms the core of a pencil consisting of the active material inclosed within a hard rubber tube having a large number of horizontal slots. I make the frames and cores for these batteries from antimonial lead, containing 87 percent lead and 13 percent antimony, provide said frames and cores with an electro-deposition of a lead alloy containing less than 0.2 percent antimony or other metals being more electro-positive than lead, insert the cores into hard rubber tubes with slots, fill the tubes with lead oxides, burn the tubes to the frames, form them in sulphuric acid, and manufacture from the thus treated frames and cores the electrodes ready for use, in the usual manner.

3. I make an alloy containing 87 percent lead and 13 percent antimony, cast from this alloy an electrode grid, provide by the "Schoop" process e. g. by atomizing with an air brush this grid with an alloy coating containing more than 98 percent pure lead, about 0.1 percent tellurium and less than 0.5 percent of antimony, past the thus coated grids with active material and treat thereafter the coated and pasted grids in usual manner.

4. I make the frames and cores for lead acid storage batteries of the "iron-clad" type from antimonial lead, containing 88 percent lead and 12 percent antimony, provide these frames and cores by pressing on with a layer of a lead alloy containing less than 0.2 percent of antimony and containing preferably up to 1 percent tellurium, providing thereby the frames and cores with a protecting layer, and after pasting the thus coated grids I treat them in the usual manner.

5. I make an alloy containing a high percentage of lead e. g. 87 percent and 13 percent antimony, cast from this alloy an electrode grid, dip this grid into fused pure soft lead, providing thereby the grid with a coating. I continue the dipping process until the relation between the thickness of the grid and the thickness of the coating is about 20:1, e. g. if the grid has a thickness of 2 millimeters I provide it with a coating of 0.1 millimeter.

It may be seen from the foregoing description that my invention allows to manufacture lead acid storage batteries with a minimum self-discharge and to use them under conditions in which too much hydrogen gas would be formed in ordinary batteries; this occurs in case if the batteries are used under higher temperatures as usual or unusually heavy acids are used in the batteries or under conditions with frequent and heavy overcharging. In batteries equipped with electrodes according to my invention heavier acids can be used without danger for the batteries and the spaces between the electrode plates can be made very small; this is often of advantage as thereby the size of the batteries may be diminished; this diminution in size is especially important for batteries for mining locomotives, ships of small size and other vehicles in which small space is provided for equipment and in which a liberation of hydrogen gas is especially dangerous.

What I claim as new and desire to secure by Letters Patent is:

1. An electrode for storage batteries of the lead acid type, said electrode comprising a metallic support, said metallic support consisting of a lead alloy containing from 0.2 to 15 percent of antimony, and a metallic layer covering said support, said metallic layer consisting of a lead alloy containing up to 1 percent of tellurium and less than 0.5 percent of antimony.

2. An electrode for storage batteries of the lead acid type, said electrode comprising a metallic support, said metallic support consisting of a lead alloy containing from 0.2 to 15 percent of antimony, and a metallic layer covering said support, said metallic layer consisting of a lead alloy containing substantially lead, about 0.1 percent tellurium and less than 0.2% of a metal more electropositive than lead.

ANNA P. HAUEL.